United States Patent [19]

Burgert

[11] 4,037,825

[45] July 26, 1977

[54] LOOP REACTOR FOR CHEMICAL PROCESSES

[76] Inventor: Herwig Burgert, 2, Helgenstock, Giessen, Germany, 6300

[21] Appl. No.: 676,322

[22] Filed: Apr. 12, 1976

[30] Foreign Application Priority Data

Apr. 14, 1975 Germany .............................. 2516284

[51] Int. Cl.² ............................................ B01F 13/02
[52] U.S. Cl. .................................... 259/4 R; 259/18; 259/36; 259/95; 259/DIG. 17
[58] Field of Search ...................... 259/4 R, 18, 36, 95, 259/DIG. 17

[56] References Cited

U.S. PATENT DOCUMENTS

| | | | |
|---|---|---|---|
| 1,026,578 | /1912 | Hammond | 259/96 |
| 1,601,938 | 10/1926 | Campbell | 259/4 R |
| 1,939,101 | 12/1933 | Bingham | 259/95 |
| 3,361,413 | 1/1968 | Heyl | 259/4 R |
| 3,721,530 | 3/1973 | Bouchet | 259/4 R |
| 3,785,779 | 1/1974 | Li et al. | 259/4 R |
| 3,807,705 | 4/1974 | Humkey et al. | 259/95 |
| 3,826,474 | 7/1974 | Pareja | 259/4 R |
| 3,953,003 | 4/1976 | Mahig | 259/4 R |

*Primary Examiner*—William Price
*Assistant Examiner*—Joseph M. Moy
*Attorney, Agent, or Firm*—Gilbert L. Wells

[57] ABSTRACT

A loop-type reactor with a reactor housing having inlet means at one end and outlet means at the opposite end. Inside the reactor there is a guide tube arranged in the direction of the axis of the inlet means. The inner wall of the reactor is so shaped that the introduced reactants flow through the tube in one direction and are then directed to flow back in the opposite direction through a mixing chamber defined between the outer tube surface and the inner reactor wall. Thus a circulation of the reactants inside the reactor is induced. At the end remote from the inlet means the tube is provided with means for defining an annular space. Openings are provided for connecting the mixing chamber with the annular space, and escape pipes are provided for connecting the annular space with the reactor outlet. After optimal processing the reactants enter through the openings into the annular space and from there through the escape pipes to the reactor outlet.

3 Claims, 2 Drawing Figures

LOOP REACTOR FOR CHEMICAL PROCESSES

BACKGROUND OF THE INVENTION

The invention pertains to a loop-type reactor for mixing chemical substances and/or for bringing about a chemical reaction. More particularly the invention relates to loop-type wherein the reactants are in circulation about a guide tube arranged concentrically within the reactor. The circulation may be induced either by a propulsion jet or by a propeller or simply by the difference in density of the reactants.

Loop reactors of this type are not only in use for mixing and performing chemical reactions but also for the purification of exhaust gas and industrial sewage.

In a known loop reactor the reactants to be mixed are injected through a central nozzle as, for example, described in the German paper "Chemie Ing.-Techn. 43" Volume 1971, page 10, by Blenke, Bohner and Pfeiffer in an article entitled "Hydrodynamische Berechnungen von Schlaufenreaktoren fur Einphasensysteme" (=Hydrodynamic Calculations of loop reactors for One-Phase-Systems). The reactants flow through the guide tube and are deflected at its upper end by 180°. A further deflection takes place at the lower end of the guide tube. The more powerful the injection is the more intensive will the circulation of the reactants be which may circulate around the tube various times. The completed mixture emerges from the reactor through openings in the reactor bottom adjacent the nozzle.

It is, however, a disadvantage of the known loop reactor that through the outlet not only such substances, as for example liquids, emerge that are optimally mixed after a number of circulations about the guide tube but also substances which have not yet completed a circulation, or have completed only one circulation, and are, therefore, not yet fully mixed.

It is, therefore, an object of the invention to provide a loop reactor from which the substances escape only after they have been mixed or processed optimally.

DESCRIPTION OF THE INVENTION

The above stated object is attained by a loop reactor comprising a central guide tube and an inlet arranged concentrically to said guide tube on one side thereof. At the opposite end the guide tube is provided with a hollow ring which is in connection with the mixing chamber through an opening in the outer guide tube surface and which is also in connection with the reactor outlet through an escape pipe in the upper end of the tube.

Thus, if the reactor is mounted in a vertical direction the hollow ring is disposed horizontally on the upper guide tube end. The opening in the guide tube surface is an annular slot that establishes the connection between the mixing chamber and the inner ring room. The ring is further provided with a plurality of escape pipes which connect the ring room with the reactor outlet.

In another embodiment the hollow ring is formed by the guide tube itself. Along half of its length the guide tube is provided with double walls. The inner and the outer wall are combined at the upper end of the tube so that between the lower tube end and the outer wall remains an entrance for the substances. The upper tube end is, again, provided with the escape pipes that connect the room between the walls with the reactor outlet.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
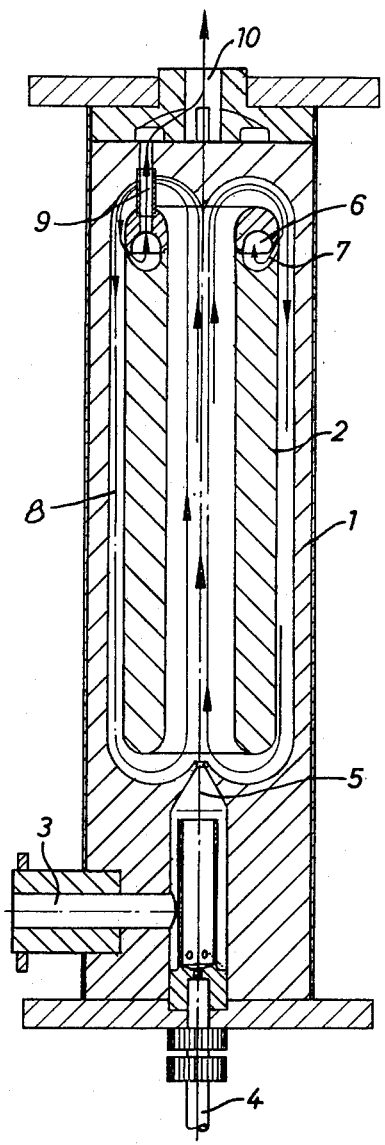
FIG. 1 is a sectional view of the invented loop-type reactor in a first embodiment, wherein the guide tube is provided with a hollow ring.

Referring now to the drawings, the cylindrical reactor housing 1 in FIG. 1 is provided with a concentrically arranged guide tube 2. At its lower end the reactor comprises an injection nozzle 5 to which the pipes 3 and 4 are connected through which the substances, i.e. gases or liquids, to be mixed are conducted.

The substances enter the guide tube 2 from below. By the bow-shaped configuration of the inner reactor wall at its upper and lower ends the circulation of the substances is induced to the effect that the substances flow in a downward direction along the outer tube wall and reenter the tube at its lower end.

On the upper end of the guide tube 2 there is mounted a hollow ring 6. An annular slot 7 establishes a connection between the mixing chamber 8 outside the tube and the annular cavity defined between the tube and the ring 6.

After a number of circulations the mixed substances enter from the mixing chamber 8 through the annular slot 7 into the hollow ring 6. From there the mixture flows through the escape pipe 9 to the reactor outlet 10.

Figure 2:
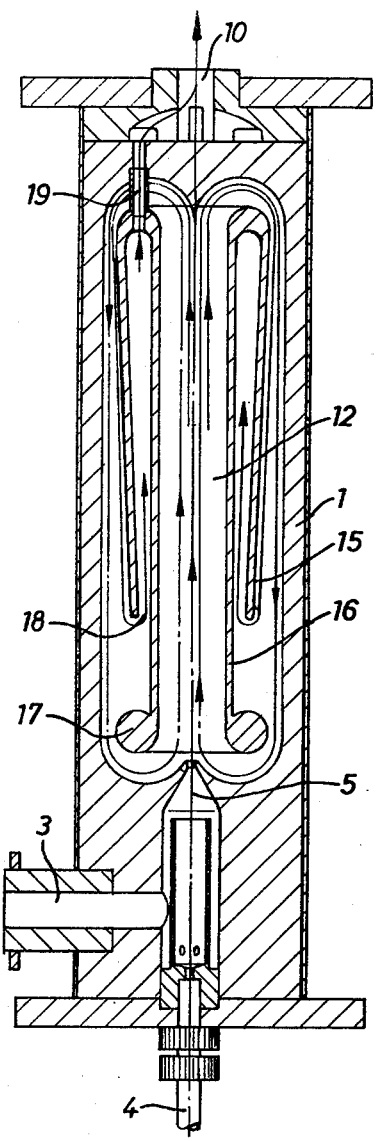
FIG. 2 is a sectional view of the invented loop-type reactor in a second embodiment, wherein the guide tube is partially provided with double walls.

In the embodiment shown in FIG. 2 the housing 1 of the reactor and its general design is similar to that of the embodiment shown in FIG. 1 The guide tube 12, however, is in the present embodiment partially provided with double walls, i.e. with an inner wall 16 and an outer wall 15. Both walls are in solid connection with one another at the upper tube end.

Between the lower end of the outer wall 15 and the lower ring-shaped end 17 of the guide tube 12 there is defined an annular opening 18 through which the mixed substances enter and rise up to the escape pipe 19 from where they reache the reactor outlet 10.

Although in the FIGS. 1 and 2 there is shown only one escape pipe 9 and 19 respectively it should be understood that in either embodiment a plurality of such escape may be distributed along the upper tube end.

What is claimed is:

1. A loop reactor for chemical processes, comprising a reactor housing including inlet means at one end and outlet means at the opposite end of said housing;
   pipes connected to said inlet means for supplying the reactants to be processed to the reactor;
   a guide tube in said reactor housing defining a mixing chamber between said guide tube and the inner wall of said reactor housing;
   means for inducing a circulation of said reactants through and around said guide tube;
   annular means connected to said guide tube end adjacent said outlet means defining an annular space at one end of said guide tube, said annular space being connected to said mixing chamber by openings through which said reactants enter into said annular space; and escape pipes connected to said annular space for conducting said reactants to said reactor outlet.

2. A loop reactor as claimed in claim 1, wherein said annular means for defining said annular space at one end of said guide tube comprise a hollow ring (6) mounted on the end of said guide tube (2), and wherein said openings for said reactants to enter said annular space is an annular slot (7) between said hollow ring and said tube end.

3. A loop reactor as claimed in claim 1, wherein said annular means for defining said annular space at one end of said guide tube comprise an outer tube wall (15) connected to said guide tube at one end, and wherein said openings for said reactants to enter said annular space is an annular opening (18) between the free end of said outer tube wall (15) and said inner tube wall (16).

* * * * *